June 17, 1947. V. D. LANDON 2,422,424
WIDE RANGE VARIABLE FREQUENCY GENERATOR
Filed April 19, 1944
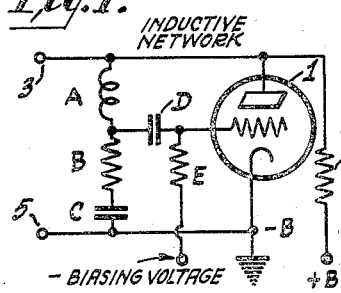
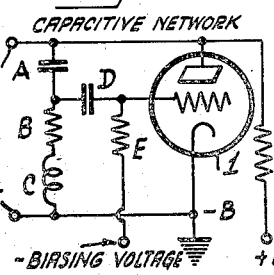
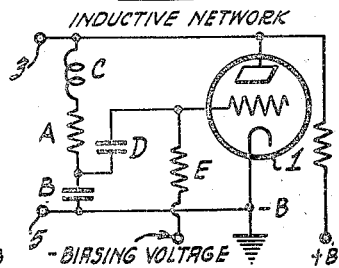
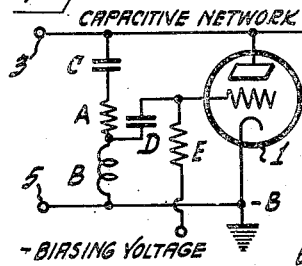
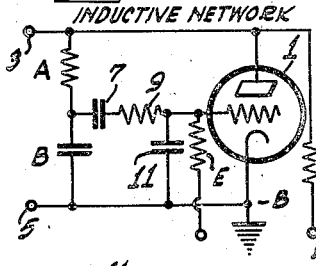
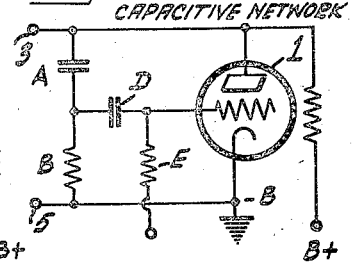
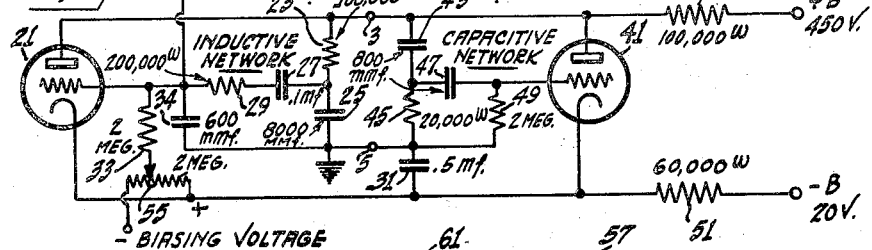
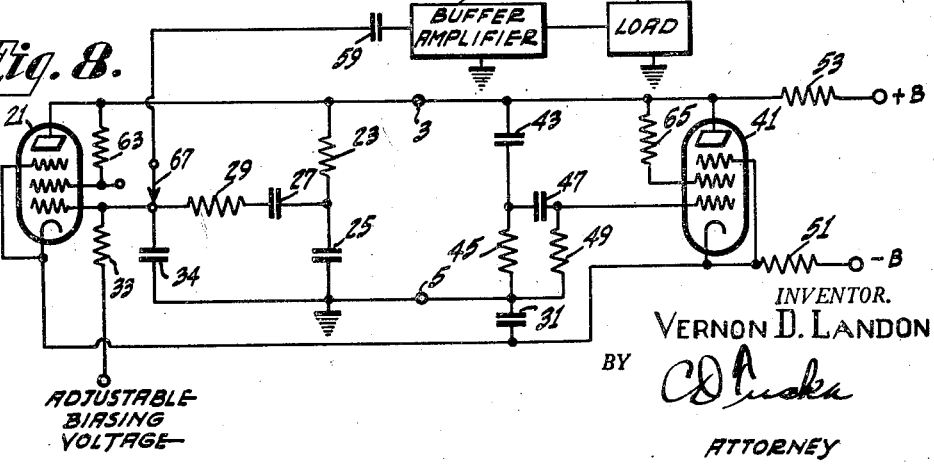
INVENTOR.
VERNON D. LANDON
BY
ATTORNEY Patented June 17, 1947

2,422,424

UNITED STATES PATENT OFFICE 2,422,424

WIDE RANGE VARIABLE FREQUENCY GENERATOR

Vernon D. Landon, Princeton, N. J., assignor to Radio Corporation of America, a corporation of Delaware Application April 19, 1944, Serial No. 532,017

11 Claims. (Cl. 250—36)

1

This invention relates generally to oscillation generators and more particularly to wide range variable frequency oscillation generators employing suitably connected variable reactance tubes as the adjustable reactance elements of an oscillatory circuit.

Variable reactance tubes have been employed extensively heretofore as automatic frequency control devices for controlling the frequency of local oscillators in conventional superheterodyne radio receivers to provide stabilization of the receiver intermediate frequency in the presence of varying signal frequencies or slight variations in the receiver circuit tuning components.

It is well known that the anode circuit impedance of a conventional thermionic discharge tube may be made "reactive" by applying a voltage to the tube control electrode which is substantially in quadrature with the voltage applied to the tube anode electrode. If the voltage applied to the tube control electrode leads the voltage applied to the anode electrode, the anode-cathode impedance of the tube appears to be a capacitive reactance. Similarly, if the voltage applied to the control electrode lags behind the voltage applied to the anode, the anode-cathode impedance of the tube appears to be an inductive reactance. The power factor of the effectively reactive network represented by the anode-cathode circuit of the tube is zero if the control electrode and anode voltages are exactly in quadrature. The effective power factor is a positive value if the control electrode and anode voltages have a relative phase angle of less than 90° and the effective power factor may assume a negative value if the relative phase angle of the control electrode and anode voltages is more than 90°.

In accordance with the instant invention, an oscillation generator is provided by shunt-connecting two reactance tube circuits, one of which provides an effective capacitive reactance and the other of which provides an effective inductive reactance, and wherein the net effective power factor of the shunt-connected reactance tube circuits is a negative value. The oscillation frequency therefore will depend upon the parallel resonance of the effective reactances provided by the reactance tube circuits. This frequency may be adjusted readily by controlling either one or both of the bias voltages applied to the control electrode-cathode circuits of the reactance tubes. If desired, a single bias voltage may be applied to the circuit to vary the effective inductive and capacitive reactances therein in the same or opposite senses.

The resultant circuit thereby provides a variable frequency oscillator generator wherein the oscillation frequency may be adjusted over a much wider range than is practicable with conventional oscillator circuits, and wherein all frequency adjustment is provided by means of adjustable bias voltages applied to one or both of the shunt-connected reactance tubes.

Among the objects of the invention are to provide an improved method of and means for generating oscillatory currents. Another object of the invention is to provide an improved method of and means for generating and controlling the frequency of oscillatory currents. A further object of the invention is to provide an improved method of and means for generating oscillatory currents and controlling the frequency of said generated currents by means of a unidirectional control voltage. An additional object of the invention is to provide an improved adjustable frequency oscillation generator wherein the generated frequency may be adjusted continuously over a relatively wide frequency range.

Other objects of the invention include improved methods of and means for employing combinations of inductive and capacitive thermionic discharge reactance tube circuits for the generation of oscillatory currents. An additional object of the invention is to provide means for varying simultaneously or selectively the effective reactances of said reactance tube circuits to control continuously the frequency of said oscillatory currents. Another object of the invention is to provide an improved method of and means for generating oscillatory currents of predetermined wave form and applying said generated currents to a load device.

The invention will be described in further detail by reference to the accompanying drawing of which Figures 1 to 6 inclusive, are schematic circuit diagrams of typical thermionic discharge reactance tube circuits of types known in the prior art, Figure 7 is a schematic circuit diagram of a preferred embodiment of the invention including in combination the reactance tube circuits of Figures 5 and 6, and Figure 8 is a schematic circuit diagram of a modification of said preferred embodiment of the invention.

Referring to Figure 1, a typical inductive reactance tube network of a type employed extensively in the prior art includes a triode thermionic discharge tube 1 having its anode electrode connected to a first output terminal 3 and its cathode connected to a second output terminal 5, which may be grounded. The positive terminal of a source of anode potential, not shown, is applied to the anode of the tube 1 through an anode resistor 7. The negative terminal of the anode voltage source is connected to the tube cathode. A reactive network comprising an inductor A, a resistor B and a capacitor C, serially-connected in the order named, is connected between the anode and cathode electrodes of the tube 1. A coupling capacitor D is connected between the common terminals of the inductor A and resistor B and the control electrode of the thermionic tube 1. The negative terminal of a source of grid bias potential, not shown, is connected through a grid resistor E to the control electrode of the tube 1. The positive terminal of the grid bias voltage source is connected to the grounded cathode.

The reactive network comprising the serially-connected inductor A, resistor B and capacitor C comprises a phase splitting network whereby alternating voltages which may be applied to the terminals 3, 5, and hence to the anode and control electrodes of the thermionic tube 1 are substantially in phase quadrature, the control electrode voltage being lagging. The effective impedance across the output terminals 3, 5 therefore represents an effective inductive reactance. The effective value of the inductive reactance appearing at the output terminals 3, 5 may be controlled over a relatively wide range by adjustment of the negative biasing voltage applied through the grid resistor E to the control electrode-cathode circuit of the tube.

Figure 2 is similar to the circuit of Figure 1 with the exception that the phase splitting reactive network connected between the anode and cathode electrodes of the tube 1 includes a capacitor A, a resistor B and an inductor C, serially-connected in the order named, and wherein the control electrode of the tube 1 is coupled through the coupling capacitor D to the common terminals of the capacitor A and the resistor B. The effective impedance provided across the output terminals 3, 5 therefore represents an effective capacitive reactance since the voltages applied to the tube control electrode substantially lead the voltages applied to the tube anode by a phase angle of the order of 90°.

The circuit of Figure 3 is substantially identical to the circuit of Figure 1 with the exception that the control electrode of the thermionic tube 1 is connected through the coupling capacitor D to the common terminals of the resistor A and capacitor B of the serially-connected phase splitting network C, A, B. Since the voltage applied to the tube control electrode lags the voltage applied to the anode by a phase angle of the order of 90°, the impedance across the output terminals 3, 5 effectively comprises an inductive reactance.

The circuit of Figure 4 is similar to the circuit of Figure 2 with the exception that the control electrode of the thermionic tube 1 is connected through the coupling capacitor D to the common terminals of the resistor A and inductor B of the serially-connected phase splitting network C, A, B. Since the voltage applied to the tube control electrode leads the voltage applied to the anode by a phase angle of the order of 90°, the impedance across the output terminals 3, 5 comprises an effective capacitive reactance.

In the circuits of Figures 1 to 4, inclusive, if the circuit element C is omitted, or has a substantially zero impedance, if the coupling capacitor D is a relatively large capacitance and if the grid resistor E is a relatively high resistance, the control electrode voltage will have a phase angle slightly less than 90° with respect to the anode potential when an alternating potential is applied to the terminals 3, 5. The circuit component C is included in each circuit to increase the phase angle between the anode and control electrode voltages to a value which equals or exceeds 90°, in order to provide an effectively zero or negative circuit power factor. The impedance of the element A should exceed or be of the order of ten times the impedance of the element B of the phase splitting network over the desired frequency range.

If it is desired to eliminate all inductive reactors from the reactance tube networks, the circuits of Figures 1 to 4 may be modified as illustrated in the circuits of Figures 5 and 6. In the circuit of Figure 5, the phase splitting network connected between the anode and cathode tube electrodes comprises a resistor A and capacitor B serially connected between said electrodes in the order named. The capacitor B is shunted by a series reactive circuit including a second capacitor 7, a second resistor 9 and a third capacitor 11. The common terminals of the second resistor 9 and the third capacitor 11 are connected to the control electrode of the tube 1.

As in the circuits illustrated by Figures 1 to 4, the effective impedance of the circuit element A should be at least of the order of ten times the impedance of the circuit element B, thereby providing nearly 90° phase shift between the tube anode voltage and the voltage on the common terminal of the elements A and B throughout the desired frequency range. The second resistor 9 should have considerably less impedance than the third capacitor 11 whereby the circuit elements 9, 11 result in a slight additional phase shift which preferably is sufficient to increase the relative phase angle of the voltages applied to anode and control electrode to slightly in excess of 90°. It should be understood that the second capacitor 7 comprises a relatively large blocking capacitor for the purpose of isolating the control electrode of the tube 1 from the anode biasing potential. As in the circuit illustrated by Figure 3, the voltage applied to the control electrode lags behind the voltage applied to the anode of the tube 1, thereby providing an output impedance across the output terminals 3, 5 which is effectively an inductive reactance.

The circuit of Figure 6 is similar to the circuit of Figure 2 with the exceptions that the inductive reactor C is omitted, and the relative impedances of the circuit elements A with respect to B and of D with respect to E should be proportioned to provide a voltage at the control electrode of the tube 1 which leads by a phase angle of slightly more than 90° the voltage applied to the anode. The circuit elements should be proportioned so that the impedance of the capacitive element A is at least of the order of ten times the impedance of the resistive element B while the impedance of the second capacitive element D is smaller than the impedance of the second resistive element E throughout the desired frequency range. The effective input impedance across the output terminals 3, 5 therefore effectively comprises a capacitive reactance with a negative power factor.

The circuit of Figure 7, which comprises a preferred embodiment of the instant invention, includes an inductive network of the type illustrated in Figure 5 connected in parallel with a capacitive network of the type illustrated in the circuit of Figure 6. It should be understood that any other combination of the inductive and capacitive reactance tube circuits described herein, or known in the art, may be employed.

The common output terminals 3, 5 of the inductive and capacitive reactance tube networks are respectively connected together, and the network components are proportioned so that the effective net power factor of the two networks is a negative value to provide for sustained oscillations in the combined circuit. A typical example of such combined inductive and capacitive reactance tube networks, proportioned to provide generated oscillations which may be adjustable over a frequency range of about 200 to 2000 cycles, includes a first reactance tube 21 having its anode connected to the output terminal 3 and to one terminal of a first 100,000$^\omega$ resistor 23. The remaining terminal of the first resistor 23 is connected through an 8,000 $\mu\mu f.$ first capacitor 25 to ground. The common terminals of the first resistor 23 and first capacitor 25 are connected to one terminal of a .1$\mu f.$ second capacitor 27, the other terminal of which is connected through a 200,000$^\omega$ second resistor 29 to the control electrode of the first reactance tube 21. The cathode of the first reactance tube 21 is coupled to ground and to the remaining network output terminal 5 through a .5$\mu f.$ bypass capacitor 31. Grid bias is applied to the control electrode of the first reactance tube 21 through a 2 megohm grid resistor 33. A 600 $\mu\mu f.$ capacitor 34 connected between the tube control electrode and ground completes the phase splitting circuit.

The second reactance tube 41 has its anode electrode connected to the network terminal 3 and to one terminal of an 800 $\mu\mu f.$ third capacitor 43. The remaining terminal of the third capacitor 43 is connected to one terminal of a 20,000$^\omega$ third resistor 45, the other terminal of which is connected to the network output terminal 5 and to ground. The common terminals of the third capacitor 43 and third resistor 45 are connected through an 800 $\mu\mu f.$ fourth capacitor 47 to the control electrode of the second reactance tube 41. A 2 megohm fourth resistor 49 is connected between the control electrode of the second reactance tube 41 and the grounded network terminal 5. The cathode of the second reactance tube 41 is connected to the cathode of the first reactance tube 21. A common 60,000$^\omega$ cathode resistor 51 is connected between the cathodes of the two tubes and the negative terminal of the source of anode potential, not shown. The positive terminal of the anode energizing voltage source is connected through a 100,000$^\omega$ anode resistor 53 to the anodes of the two reactance tubes 21, 41.

When the inductive reactance tube network including the first reactance tube 21, and the capacitive reactance tube network including the second reactance tube 41 are thus connected in parallel, a phantom tuned circuit results which comprises the effective inductive reactance of the inductive network and the effective capacitive reactance of the capacitive network forming a parallel resonant circuit. If the net effective power factor of the two networks is a negative value, oscillations will build up in the phantom circuit until grid current or saturation effects in one or both of the reactance tubes reduces the effective circuit power factor to zero. The oscillations will have a frequency determined by the effective parallel resonance of the phantom circuit.

Biasing the control electrode of the inductive reactance tube more positively or biasing the control electrode of the capacitive reactance tube more negatively, both with respect to the tube cathodes, increases the frequency, and vice versa. Since a common cathode resistor 51 is employed for both tubes, a single controlling bias voltage applied to the control electrode of the inductive reactance tube 21 effectively controls the effective reactances of the two reactance tubes simultaneously in opposite senses. A maximum to minimum frequency range of 10 to 1 is readily obtainable by simple adjustment of the movable element of a 2 megohm potentiometer 55 having its resistive element connected across a source of grid bias potential, not shown, to provide adjustable biasing voltage for the control electrode of the inductive reactance tube. It should be understood that the grid potential on either of the reactance tubes may be adjustable or that separate adjustments of grid potential on both tubes may be provided. It should be understood that the circuit element constants specified heretofore are merely illustrative of one actual embodiment of the invention for a particular frequency range, and that any or all values may be varied in any manner known to persons skilled in the art.

Since the best wave shape of the generated oscillations occurs at the control electrode of the inductive reactance tube, and since this electrode is at relatively high impedance with respect to ground, a preferred connection to a load device 57 includes a relatively small capacitor 59 coupling the control electrode of the first reactance tube 21 to the input of a conventional buffer amplifier 61, the output of which is connected to the load 57. It should be understood that any other type of output coupling circuit known in the art may be employed, and that output potentials may be derived from any other desired portion of the oscillation generating network.

The circuit of Figure 8 is identical to the circuit of Figure 7 with the exception that pentode thermionic tubes have been substituted for the triode tubes shown in Figure 7. All circuit connections are identical to the circuit of Figure 7 with the exception that the tube screen electrodes are connected to the corresponding tube anodes through screen resistors 63, 65 respectively, and the tube suppressor electrodes are connected directly to the respective tube cathodes. The buffer amplifier input circuit is shown connected to the movable element 67 of a single-pole, double-throw switch of which the fixed contacts are connected to the control electrode and screen electrode, respectively, of the first reactance tube 21. Actuation of the switch contact 63 thereby permits selection of generated potentials from either the control electrode or screen electrode of the inductive reactance tube.

Thus the invention described comprises an improved adjustable frequency oscillation generator employing parallel-connected inductive and capacitive reactance tube circuits wherein the oscillation frequency is controlled by varying the control electrode bias of one or both of the reactance tubes. Continuous adjustment of frequency is thereby provided over a relatively wide frequency band.

I claim as my invention:

1. An oscillation generator including, in combination, a phantom tuned network comprising interconnected capacitive and inductive reactance thermionic tube circuits, means for energizing said circuits, and means providing a net power factor for said network of a negative value so as to provide sustained oscillations therein at a frequency determined by the effective impedances of said circuits.

2. An oscillation generator including, in combination, a first reactance tube circuit providing an effectively inductive output impedance, a second reactance tube circuit providing an effectively capacitive output impedance, means for energizing said circuits, and means connecting said circuits in mutually operable relation, the net power factor of said connected circuits being a negative value to provide sustained oscillations therein at a frequency determined by the effective impedances of said connected circuits.

3. Apparatus of the type described in claim 2 including a source of adjustable potential, and means for applying said potential to at least one of said circuits to vary the effective impedance thereof and hence to control said oscillation frequency.

4. Apparatus of the type described in claim 2 including a source of adjustable potential, and means for applying said potential to at least one of said circuits to vary simultaneously in relatively opposite senses the impedances of said circuits for controlling said oscillation frequency.

5. An oscillation generator including, in combination, a first reactance tube having at least a cathode, an anode and a control electrode, means for applying potentials relatively of the order of in phase quadrature relation to said anode and said control electrode, said control electrode potential being lagging, to provide an effectively inductive anode-cathode impedance, a second reactance tube having at least a cathode, a plate, and a control grid, means for applying potentials relatively of the order of in phase quadrature relation to said plate and said grid, said grid potential being leading, to provide an effectively capacitive-plate-cathode impedance, and means connecting the anode-cathode circuit of said first tube to the plate-cathode circuit of said second tube to provide a phantom tuned circuit characteristic of said effective impedances, the net power factor of said tuned circuit being a negative value to provide sustained oscillations therein at a frequency determined by the effective impedances of said connected circuits.

6. Apparatus of the type described in claim 5 including a source of adjustable potential, and means for applying said potential to at least one of said tubes to vary the effective impedance thereof and hence to control said oscillation frequency.

7. Apparatus of the type described in claim 5 including a common cathode resistor for said tubes, a source of adjustable bias potential, and means for applying said potential to bias one of said tubes to vary simultaneously in relatively opposite senses the effective impedances of said circuits for controlling said oscillation frequency.

8. An oscillation generator including, in combination, a first reactance tube having at least a cathode, an anode and a control electrode, means including a first resistive-capacitive network connected to said first tube for applying potentials relatively of the order of in phase quadrature relation to said anode and said control electrode, said control electrode potential being lagging, to provide an effectively inductive anode-cathode impedance, a second reactance tube having at least a cathode, a plate, and a control grid, means including a second resistive-capacitive network connected to said second tube for applying potentials relatively of the order of in phase quadrature relation to said plate and said grid, said grid potential being leading, to provide an effectively capacitive plate-cathode impedance, and means connecting the anode-cathode circuit of said first tube to the plate-cathode circuit of said second tube to provide a phantom tuned circuit characteristic of said effective impedances, the net power factor of said tuned circuit being a negative value to provide sustained oscillations therein at a frequency determined by the effective impedances of said connected circuits.

9. An oscillation generator including, in combination, a first reactance tube having at least a cathode, an anode and a control electrode, means including a first resistive-capacitive-inductive network connected to said first tube for applying potentials relatively of the order of in phase quadrature relation to said anode and said control electrode, said control electrode potential being lagging, to provide an effectively inductive anode-cathode impedance, a second reactance tube having at least a cathode, a plate, and a control grid, means including a second resistive-capacitive-inductive network connected to said second tube for applying potentials relatively of the order of in phase quadrature relation to said plate and said grid, said grid potential being leading, to provide an effectively capacitive plate-cathode impedance, and means connecting the anode-cathode circuit of said first tube to the plate-cathode circuit of said second tube to provide a phantom tuned circuit characteristic of said effective impedances, the net power factor of said tuned circuit being a negative value to provide sustained oscillations therein at a frequency determined by the effective impedances of said connected circuits.

10. Apparatus of the type described in claim 5 including a load circuit and means coupled to the control electrode of said first tube for applying said generated oscillations to said load circuit.

11. In an oscillation generator, a first electron discharge device having an anode, a cathode, and a control grid, a phase shifting network coupling the anode of said device to the control grid of said device, the characteristic of the network being such as to relatively advance the phase of voltages of the operating frequency on the anode of said device about 90° with respect to the phase of the said voltages on the control grid, a second electron discharge device having a control grid, a cathode, and an anode, a second phase shifting network coupling the anode of the last mentioned device to its control grid, the character of the last mentioned network being such as to relatively retard the phase of voltages of the said desired operating frequency on the anode of the last mentioned device about 90° with respect to the phase of the said voltages on the control grid of said last device, connections putting the anode to cathode impedances of said tubes in parallel, the networks, the output impedances of the devices and the connections then having a net power factor which is negative, leads to the electrodes of said devices for applying thereto direct current operating potentials, and an output circuit coupled to at least one of said devices.

VERNON D. LANDON.

REFERENCES CITED

The following references are of record in the file of this patent:

UNITED STATES PATENTS

| Number | Name | Date |
| --- | --- | --- |
| 2,248,132 | Smith | July 8, 1941 |
| 1,313,188 | Hull | Aug. 12, 1919 |